United States Patent [19]
Elford et al.

[11] 3,803,999
[45] Apr. 16, 1974

[54] APPARATUS FOR TREATMENT OF CANNED MATERIAL
[75] Inventors: David Elford, Kyabram; Patrick Jones, Griffith, New South Wales, both of Australia
[73] Assignee: Kelly & Lewis Pty. Ltd., Springvale, Victoria, Australia
[22] Filed: July 10, 1972
[21] Appl. No.: 269,988

[52] U.S. Cl.................. 99/362, 99/443 C, 198/131
[51] Int. Cl.............................................. A23l 3/02
[58] Field of Search ............ 99/360, 353, 359, 361, 99/362, 443 C; 198/31 AB, 131; 214/6 P

[56] References Cited
UNITED STATES PATENTS
2,811,914  11/1957  Chironis........................... 99/404 X
3,152,537  10/1964  Dietz................................. 99/404
3,211,275  10/1965  Van Der Winden.............. 99/360 X
3,347,351  10/1967  Mencacci et al. ................ 99/360 X
3,470,996  10/1969  Lee et al. .................. 198/31 AB X
3,659,726  5/1972   Anderson................... 198/31 AB X Primary Examiner—Robert W. Jenkins
Assistant Examiner—Arthur O. Henderson
Attorney, Agent, or Firm—Flehr, Hohbach, Test, Albritton & Herbert

[57] ABSTRACT

Apparatus for treatment of canned material by passing cans on a conveyor through a treatment zone, the conveyor consisting of two spaced endless chains with elongate members extending therebetween to define can receiving compartments to each face of the conveyor.

5 Claims, 10 Drawing Figures 3,803,999

APPARATUS FOR TREATMENT OF CANNED MATERIAL

BACKGROUND OF THE INVENTION

1. Field of the Invention

This invention relates to apparatus for treatment of canned material and has particular application to cookers for cooking such material.

The invention is specifically concerned with means for conveying cans through the treatment apparatus. It is an object of the invention to provide a novel conveyor arrangement by which there can be achieved a very high loading factor per unit of volume of the apparatus. This conveyor arrangement also permits use of simple but most effective loading and unloading means.

BRIEF SUMMARY OF THE INVENTION

According to the invention there is provided apparatus for treatment of canned material comprising conveyor means extending through a treatment zone, said conveyor means comprising an endless conveyor, means for supporting said conveyor, said conveyor having compartments to receive rows of end-to-end cans, and means for moving the conveyor whereby to pass cans in said compartments through said treatment zone, said endless conveyor having a pair of side chains and a plurality of elongate members which are supported at opposite ends, in transverse dispositions relative to the conveyor, by the chains whereby said compartments are defined by spaces between the elongate members to each face of the conveyor and extend across the conveyor.

The conveyor may hang from a support and drive structure in a vertically extending closed loop.

Preferably there is means to load cans into the compartments on both faces of the conveyor at a loading station disposed at a location along a vertical run of the conveyor. Such means may simultaneously load two rows of cans into respective compartments on opposite faces of the conveyor.

Similarly there may be provided unloading means capable of simultaneously unloading two rows of cans from respective compartments at opposite faces of the conveyor. Such unloading means may be disposed immediately in advance of the loading means in the direction of travel of the conveyor and may operate synchronously with the loading means.

BRIEF DESCRIPTION OF THE SEVERAL VIEWS OF THE DRAWING

In order that the invention may be more fully explained, one particular type of cooker incorporating a conveyor arrangement in accordance with the present invention will now be described in some detail with reference to the accompanying drawings, in which.

DETAILED DESCRIPTION

Figure 1:
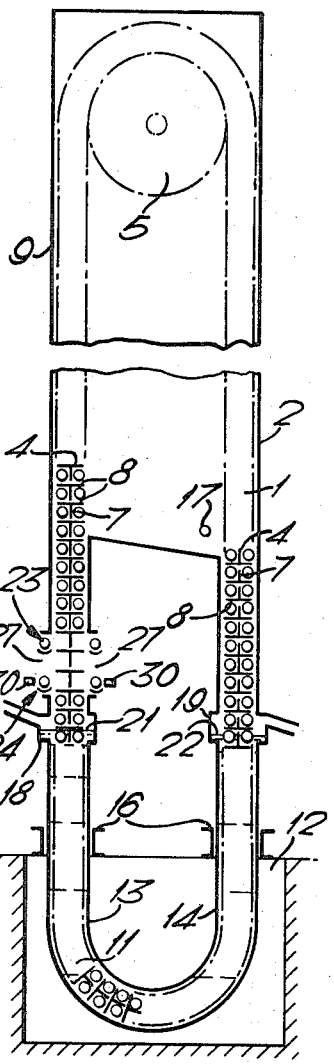
FIG. 1 is a schematic vertical section through one particular cooker constructed in accordance with the invention.
Figure 2:
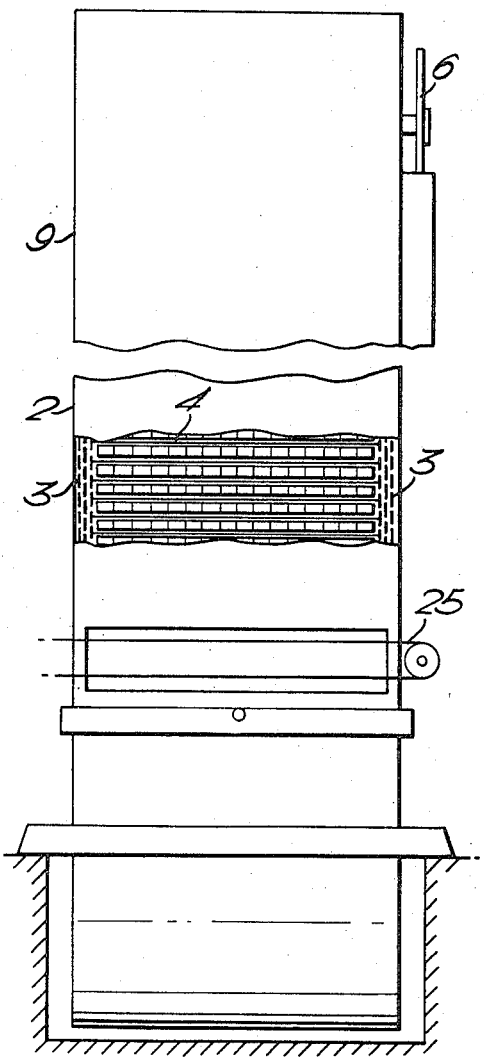
FIG. 2 is an end elevation of the cooker with part of the wall of its vessel broken away.

The illustrated cooker essentially comprises a single continuous loop conveyor 1 disposed within a closed vessel 2. The belt-like conveyor 1 is comprised of a pair of side chains 3 between which there extend parallel bars 4 of T-cross-section. The conveyor hangs in a vertical loop from a drive drum 5 which is disposed within the upper end of the vessel 1 and has sprockets to engage the conveyor side chains 3. The drum can be driven via a sprocket 6 and chain drive from a drive means disposed outside the vessel.

Bars 4 are fixed to the conveyor chains 3 with the central legs 7 of the T-shapes extending longitudinally of the conveyor and their flange parts 8 arranged transversely of the conveyor. They are arranged at such pitch that can receiving compartments are formed at each side of the conveyor between the flanges 8. Each compartment can receive a row or "stick" of cans arranged end-to-end horizontally across the conveyors.

Vessel 2 comprises a tall rectangular box portion 9 which encompasses the upper parts of both the vertical spans of the conveyor and from the bottom of which there depends a generally U-shaped portion 11 through which the bottom part of the conveyor extends and which closely confines that part of the conveyor. Bottom part 11 of the vessel depends into a floor well 12 and its respective legs 13, 14 extend through supports 16.

The upper box portion of vessel 2 has a steam inlet 17 and the legs 13, 14 of the lower part of the vessel are provided respectively with an annular water inlet ring 18 and an overflow water outlet ring 19. Thus steam can be introduced into the upper part of the vessel whilst water can be circulated through the U-shaped part of the vessel disposed beneath the inlet and outlet rings 18, 19.

Steam interfaces 21, 22 will then form to serve as boundaries between a steam-filled upper part of the vessel and a water-filled lower part of the vessel. The cans of produce to be cooked are fed onto the conveyor at a feed station 23 whence they traverse the outer periphery of the upper steam-filled part of the vessel by passing upwardly over the drum 5 and then down to the water/steam interface 22. They then pass through the water-filled lower part of the vessel and then upwardly to a discharge station 24 where they are unloaded from the conveyor.

Figure 3:
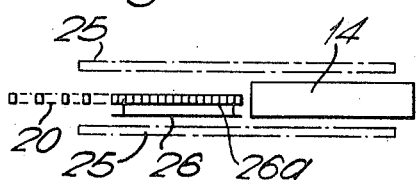
FIGS. 3 to 10 illustrate diagrammatically how cans are fed into and out of the cooker.
Figure 4:
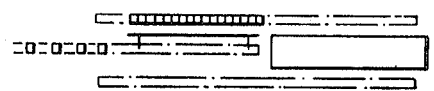
Figure 5:
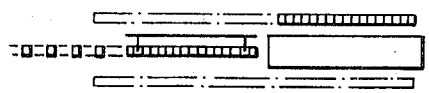
Figure 6:
Figure 7:
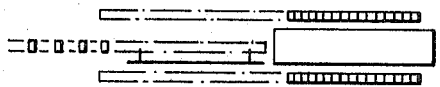
Figure 8:
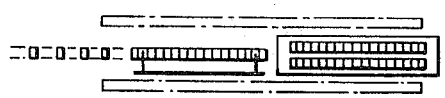

The method of feeding the cans onto the conveyor on the feeding station 23 is shown in FIGS. 3 to 8 which show successive stages of an operation whereby cans are fed onto the conveyor via a feed conveyor 20, a pair of side conveyors 25 and an alternating feed paddle 26. FIG. 3 shows the single line feed conveyor 20 supplying cans to form a "stick". When a stick of the correct number is assembled the cans are swept onto one of the side conveyors 25 by the alternating feed paddle as shown in FIG. 4. The cans on this conveyor are transferred to the feed station and, meanwhile, a new "stick" of cans is assembled on the feed conveyor (FIG. 5). The new stick is then transferred to the second side conveyor 25 (FIG. 6) and conveyed to the feed station (FIG. 7). The feed paddle 26 has a bar portion 26a which is secured to lower ends of downwardly depending arms. The arms are secured at upper ends thereof and means (not shown) is provided for swinging the paddle back and forth, about a common pivot axis of the arms, to effect sweeping of the sticks of cans from conveyor 20 alternately to the respective conveyors 25. Both sticks of cans are positioned at the ends of conveyors 25 by engagement with tops (not shown)

and are then simultaneously transferred from the side conveyors through hatches 27 in the vessel leg 13 into respective compartments of the conveyor of FIG. 8. This transference is effected by means of feed paddles like the feed paddle 26. The conveyor is advanced in discrete steps of one pitch of the bars 4 and the process is repeated continuously.

Figure 9:
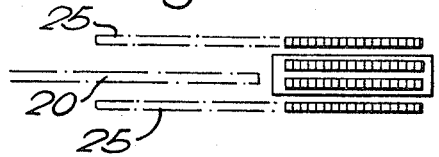
Figure 10:

Discharge of processed cans is accomplished simultaneously with the feeding of new cans through the same hatches 27. On the discharge station a permanent magnet 30 is mounted outside the vessel on each side of the conveyor. Each time the conveyor is advanced the respective "sticks" of processed cans are withdrawn from each side by magnetic forces and are deposited on the return stage of the side conveyors as shown in FIG. 9 and thence alternately to the return run of the feed conveyor 20 to discharge for a single line as shown by FIG. 10. The "sticks" are carried on upper surfaces of the return runs of the conveyors 20 and 25, movement of the "sticks" from the conveyors 25 onto conveyor 20 being accomplished along guides 31 which converge from the conveyors 25 to conveyor 20. Suitable stop means is provided for selectively and alternately blocking these guides so that the "sticks" from the two conveyors are alternately delivered without interference.

The conveyor arrangement in the illustrated cooker is of very simple construction compared to the can transport means of conventional cookers and it affords a higher loading factor per unit of volume. Moreover the means of feeding and discharging the cans is much simplified compared with conventional apparatus. Because the cans are loaded and unloaded in "full sticks" at both faces of the conveyor each chain is loaded equally and the loads on each side of the carrier bars are balanced so that eccentric loading of the chains is effectively eliminated. The simple single loop of conveyor reduces chain flexing to an absolute minimum and thus ensures long life of the chains and guides.

The illustrated cooker has, however, been advanced by way of example only and it is to be understood that the invention is in no way limited to the details of this construction but includes many modifications and variations within the scope of the appended claims.

We claim:

1. Apparatus for treatment of canned material comprising conveyor means extending through a treatment zone, said conveyor means comprising an endless conveyor, means for supporting said conveyor, said conveyor having compartments formed thereon to receive rows of end-to-end cans, and means for moving the conveyor whereby to pass cans in said compartments through said treatment zone, said endless conveyor having a pair of side chains and a plurality of spaced transverse elongate members with "T" shaped cross sections which are supported at opposite ends by said side chains with the central leg of the T extending longitudinally of the conveyor and the flange parts of the T extending laterally of the conveyor, said central legs of the T defining opposite faces of the conveyor, whereby said compartments are defined on each of said opposite faces between the flange parts of adjacent spaced transverse elongate members and wherein said conveyor is supported in a vertically extending closed loop.

2. Apparatus as claimed in claim 1 wherein means is provided to load cans in predetermined equal numbers into the compartments on both of said opposite faces of the conveyor at a loading station disposed at a location along a vertical run of the conveyor.

3. Apparatus as claimed in claim 2, wherein said means for loading cans is operable to simultaneously load two rows of cans into respective compartments on said opposite faces of the conveyor whereby loading on each of said spaced transverse elongate members is balanced eliminating eccentric loading of said side chains.

4. Apparatus as claimed in claim 3, wherein there is provided unloading means operable to unload two rows of cans simultaneously from respective compartments at said opposite faces of the conveyor, said unloading means being disposed immediately in advance of the loading means in the direction of travel of the conveyors and operating synchronously with the conveyor.

5. Apparatus as claimed in claim 2, wherein said conveyor comprises a main conveyor together with loading means and unloading means comprising a feed conveyor and a pair of side conveyors, the side conveyors and feed conveyor being generally horizontal and said side conveyors being disposed adjacent to said opposite faces of one vertical run of said main conveyor, said feed conveyor receiving cans on an upper run thereof and assembling them into "sticks" of cans, means for transferring successively assembled sticks to upper runs of alternate ones of said side conveyors for movement adjacent to said opposite faces, said drive means being operable to advance said main conveyor step by step, means operating synchronously with said main conveyor upon advancement of the conveyor by one step to a loading position to simultaneously move the sticks on the side conveyors into compartments at said loading position on said opposite faces of said main conveyor by moving them laterally off the side conveyors, means disposed immediately in advance of said loading position for simultaneously removing sticks of cans from following compartments on said opposite faces of the conveyor laterally onto the upper surfaces of the return runs of the respective side conveyors for transfer toward the feed conveyor, and means for subsequently guiding the unloaded sticks onto the return run of the feed conveyor, whereby the treated cans are removed from the vicinity of the apparatus.

* * * * *